(12) United States Patent
June et al.

(10) Patent No.: US 10,366,371 B2
(45) Date of Patent: Jul. 30, 2019

(54) METHOD AND APPARATUS FOR PROCESSING SERVICE REQUESTS

(71) Applicant: The Boeing Company, Chicago, IL (US)

(72) Inventors: Philip Gabriel June, Irvine, CA (US); Bryan Quolent Yu, Austin, TX (US); Thai Thanh Nguyen, La Mirada, CA (US); Candice Sik Suen Chan, Richmond (CA); Amir Danak, Vancouver (CA); Ruiwei Jiang, Vancouver (CA)

(73) Assignee: The Boeing Company, Chicago, IL (US)

(*) Notice: Subject to any disclaimer, the term of this patent is extended or adjusted under 35 U.S.C. 154(b) by 659 days.

(21) Appl. No.: 15/010,361

(22) Filed: Jan. 29, 2016

(65) Prior Publication Data

US 2017/0221015 A1     Aug. 3, 2017

(51) Int. Cl.
*G06N 20/00*     (2019.01)
*G06Q 10/00*     (2012.01)
*G06Q 30/00*     (2012.01)
*G06Q 10/06*     (2012.01)

(52) U.S. Cl.
CPC ............ *G06Q 10/20* (2013.01); *G06N 20/00* (2019.01); *G06Q 10/06315* (2013.01); *G06Q 30/016* (2013.01)

(58) Field of Classification Search
CPC ............ G06Q 10/06; G06Q 10/06311; G06Q 10/0631; G06Q 10/20; G06Q 30/016; G06F 17/30867; G06F 17/3053; G06F 17/30598
USPC .......... 707/E17.109, E17.014, 722, E17.044, 707/723, 736, 758, 748, 754, E17.059
See application file for complete search history.

(56) References Cited

U.S. PATENT DOCUMENTS

2008/0082229 A1    4/2008  Wingenter
2009/0276438 A1*  11/2009  Lake ................. G06F 17/30389
2012/0042318 A1    2/2012  Doan et al.

OTHER PUBLICATIONS

Liu, "Chapter 2: Mining Association Rules," University of Illinois at Chicago, Fall Semester 2005, 53 pages, accessed Jan. 27, 2016. https://www.google.com/url?sa=t&rct=j&q=&esrc=s&source=web &cd=6&cad=rja&uact=8&ved= 0ahUKEwicko6YxcrKAhUpu4MKHVg8BXoQFghBMAU&url= https%3A%2F%2Fwww.cs.uic.edu%2F~liub%2Fteach%2Fcs583- fall-05%2FCS583-association-rules.ppt&usg=AFQjCNGuLpeSa61G2_ supCx0aThT4YlPlg&sig2=KDMU2pwdiDSRNFRqSAGMKg&bvm= bv.112766941,d.amc.

(Continued)

*Primary Examiner* — Robert W Beausoliel, Jr.
*Assistant Examiner* — Pedro J Santos
(74) *Attorney, Agent, or Firm* — Yee & Associates, P.C.

(57) ABSTRACT

A method and apparatus for processing service requests. A computer system creates a preliminary compendium comprising building blocks. A building block is a word entity extracted from a text source in a plurality of text sources that are related to a domain of interest. At least a portion of the text sources comprises past service requests. The computer system filters the building blocks in the preliminary compendium based on relevance with respect to the domain of interest to create similarity indicators that form a refined compendium. The computer system analyzes text within a new service request using the past service requests and the refined compendium to generate a ranking of past service requests that ranks the past service requests based on similarity to the new service request. The ranking of past service requests enables the computer system to identify a set of possible resolutions for the new service request.

22 Claims, 8 Drawing Sheets

(56) References Cited

OTHER PUBLICATIONS

Landauer et al., "An Introduction to Latent Semantic Analysis," Discourse Processes, vol. 25, copyright 1998, 41 pages.
European Search Report, dated Feb. 28, 2017, regarding Application No. 16206854.8, 8 pages.
European Examination Report, dated Dec. 18, 2017, regarding Application No. 16206854.8, 9 pages.

* cited by examiner

| | BMN | Cycles | ATA* |
|---|---|---|---|
| | BUB-XAJ-16-1239-01C | 1905 | 5432-20 |

Subject*

[373MG_55] Dent on the RH horizontal stabilizer L/E skin between LE STA 178.90 and LE STA 189.01

Reference 305
/A/ Damage Sketch (2 pages attached)
/B/ A373-700 SAM55-10-01 Allowable damage 1

Description*

During leasing return check of the datum aircraft in BUB facility, an existing dent was found on the RH horizontal stabilizer L/E skin between LE STA 178.90 and LE STA 189.01. Please see Ref/A/ for details.

This dent dimension is in AREA 1 of Ref/B/ page 111 FIGURE 104, but the distance between the dent edge and LE STA 178.90 Rib fastener hole edge is 0.43", which is less than 1.0" - the required minimum distance between the dent edge and a hole shown in Page 105 Para. 4.D.(2).(a) of Ref/B/.
BUB has accomplished the following repair actions:
1). Performed an HFEC inspection to the dented Part Number
Part # 306 — RUN
302

CLEAR

300

| | Score | BMN | Subject | Date |
|---|---|---|---|---|
| 1 | 97.3 | AXJ-CAL-16-0987 | //373/57/N27246// - REPAIR - CORROSION C/T DROPOUT LINK OF SLAT #5 | 04/24/14 |
| 2 | 94.8 | BUB-GUN-16-0246 | [373MG_57] WEAR DAMAGE ON #1 MAIN FLAP TRACK | 11/10/14 |
| 3 | 92.5 | AAX-AAX-16-1369 | QIT/373-700/XA-PAM/WEAR DAMAGE ON SLATS NO. 5 AND 6 AT WEDGE | 12/01/14 |
| 4 | 92.5 | VON-VON-16-0321 | A373-838 LH Winglet Lightning Strike Damage Permanent Repair | 11/17/14 |
| 5 | 81.5 | AAX-AAX-16-1369 | QIT/373-700/XA-PAM/WEAR DAMAGE ON SLATS NO. 5 AND 6 AT WEDGE | 04/24/14 |

Previous 5 | Next 5 | [373MG_57] WEAR DAMAGE ON #1 MAIN FLAP TRACK

308

01C
02B
03C
04B
05C
06B
07C

During return check of datum aircraft, wear damage was found on Ref/A/ #1 main flap track.
BUB has accomplished the following steps:
1. Smoothed the wear surface by hand per Ref/C/ procedure.
2. Did fluorescent penetrant inspection to the reworked areas per SOPM20-20-02, no crack was found.
Please see Ref/B/ damage sketch for details.

310

304

Reference
/A/ 123A1234-103 S/N SS-1006
/B/ OMG 57-53-03
/C/ 373 SAM 56-54-02 Repair 10
/D/ Data with blend location and dimensions

Details
BUB-GUN-16-0246 | 4-2345600049
Part Number:
Sent Date: Nov 16 2014

METHOD AND APPARATUS FOR PROCESSING SERVICE REQUESTS

BACKGROUND INFORMATION

1. Field

The present disclosure relates generally to processing service requests and, in particular, to identifying resolutions for service requests. Still more particularly, the present disclosure relates to a computer-implemented method and apparatus for quickly and easily identifying resolutions for service requests related to aircraft maintenance.

2. Background

Manufacturers of complex systems typically provide customer support to customers by accepting service requests and providing resolutions for these service requests. The need to provide superior customer support more quickly and efficiently is especially present when dealing with complex systems such as, but not limited to, aircraft, spacecraft, watercraft, complex ground vehicles, and complex weapons systems.

Oftentimes, customers need resolutions to service requests on compressed schedules to meet operational schedules. A service request may be a maintenance request. For example, an airline customer may need an aircraft manufacturer to process and provide resolutions for a high volume of service requests for a fleet of aircraft on compressed schedules to meet airline operational schedules. Currently available systems and methods for managing service requests and identifying possible resolutions for these service requests may not be as fast or as accurate as desired. Therefore, it would be desirable to have a method and apparatus that take into account at least some of the issues discussed above, as well as other possible issues.

SUMMARY

In one illustrative embodiment, a method for improving a processing speed of processing service requests is provided. A computer system creates a preliminary compendium comprising a plurality of building blocks. A building block in the plurality of building blocks is a word entity extracted from a text source in a plurality of text sources that are related to a domain of interest. At least a portion of the plurality of text sources comprises a plurality of past service requests. The computer system filters the plurality of building blocks in the preliminary compendium based on relevance with respect to the domain of interest to create a plurality of similarity indicators that form a refined compendium. The computer system analyzes text within a new service request using the plurality of past service requests and the refined compendium to generate a ranking of past service requests that ranks the plurality of past service requests based on similarity to the new service request. The ranking of past service requests enables the computer system to identify a set of possible resolutions for the new service request.

In another illustrative embodiment, an apparatus comprises a trainer and an analyzer implemented in a computer system. The trainer creates a preliminary compendium comprising a plurality of building blocks. A building block in the plurality of building blocks is a word entity extracted from a text source in a plurality of text sources that are related to a domain of interest. At least a portion of the plurality of text sources comprises a plurality of past service requests. The trainer filters the plurality of building blocks in the preliminary compendium based on relevance with respect to the domain of interest to create a plurality of similarity indicators that form a refined compendium. The analyzer analyzes text within a new service request using the plurality of past service requests and the refined compendium to generate a ranking of past service requests that is ranked based on similarity to the new service request. The ranking of past service requests enables the computer system to identify a set of possible resolutions for the new service request.

In yet another illustrative embodiment, a request processing system implemented in a computer system comprises a data structure, a trainer, and an analyzer. The data structure stores a plurality of text sources related to aircraft maintenance. The plurality of text sources includes a plurality of past service requests received from an airline customer. The trainer creates a preliminary compendium comprising a plurality of building blocks and filters the plurality of building blocks in the preliminary compendium based on relevance with respect to the aircraft maintenance to create a plurality of similarity indicators that form a refined compendium. A building block in the plurality of building blocks is a word entity extracted from a text source in the plurality of text sources. The analyzer analyzes text within a new service request received over at least one communications link from the airline customer using the plurality of past service requests and the refined compendium to generate a ranking of past service requests that is ranked based on similarity to the new service request. The ranking of past service requests enables the computer system to identify a set of possible resolutions for the new service request.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. The different illustrative embodiments recognize and take into account that oftentimes, maintenance records are not standardized or coded, thereby making it more difficult than desired to process new service requests and identify resolutions for these new service requests.

The illustrative embodiments recognize and take into account that it may be desirable to have a method and apparatus capable of extracting information from past service requests that can be used to quickly and accurately identify resolutions to new requests. For example, the illustrative embodiments recognize and take into account that it may be desirable to have a method and apparatus capable of quickly and accurately identifying past service requests that are similar to an incoming new service request. Further, it may be desirable to have a method and apparatus for quickly and accurately providing one or more possible resolutions to the incoming new service request based on the identified similar past service requests.

The illustrative embodiments recognize that past service requests may include unstructured, raw text that is not standardized or coded. Consequently, it may be desirable to have a method and apparatus capable of quickly and accurately processing a high volume of unstructured, raw text for a large number of past service requests in a meaningful manner with respect to a domain of interest, such as aircraft maintenance.

Further, the illustrative embodiments recognize and take into account that it may be desirable to have a method and apparatus capable of identifying which past service requests in a collection of past service requests are most similar to an incoming new service request, while reducing the expense of this process and the level of engineering expertise needed to perform this process. Similarly, the illustrative embodiments recognize and take into account that it may be desirable to have a method and apparatus capable of identifying the most likely resolution or resolutions for an incoming service request in a manner that reduces the level of engineering expertise needed to perform this process.

Thus, the illustrative embodiments provide a method, apparatus, and request processing system for improving the processing service requests is provided. In particular, the processing speed of processing service requests may be improved. In one illustrative example, the free-form text in historical records, which may include past service requests and, in some case, articles, may be accessed. Meaningless phrases in the free-form text may be disregarded. Anchors may be used to identify word entities that have relevance to a particular domain of interest, such as aircraft maintenance. These word entities may then be filtered to and processed to identify indicators. Each indicator may be one word entity or a combination of word entities that has a minimum level of relevance to the domain of interest.

When the domain of interest is aircraft maintenance, a service request may be likened to a description of a set of symptoms for a maintenance issue. The indicators identified in a particular service request may be used to identify or represent this set of symptoms. A compendium of indicators may be created for past service requests. When a new service request is received, the free-form text in new service request may be searched for the presence of indicators. Any identified indicators may be used to identify a past service request that has the highest correlation to the identified indicators. In other words, the "set of symptoms" represented by the identified indicators in the new service request may be matched to a past service request having a "set of symptoms" highly correlated to the new service request. Consequently, a "diagnosis" may be provided for the new service request that has the highest correlation to a prior diagnosis.

In one illustrative example, a computer system creates a preliminary compendium comprising a plurality of building blocks. A building block in the plurality of building blocks is a word entity extracted from a text source in a plurality of text sources that are related to a domain of interest. The word entity may take the form of a single word, a root word, or a string of words, depending on the implementation. In one illustrative example, the domain of interest may be aircraft maintenance. In other illustrative examples, the domain of interest may be spacecraft maintenance, satellite maintenance, ship maintenance, or some other type of maintenance.

At least a portion of the plurality of text sources comprises a plurality of past service requests. The computer system filters the plurality of building blocks in the preliminary compendium based on relevance with respect to the domain of interest to create a plurality of similarity indicators that form a refined compendium. The computer system analyzes text within a new service request using the plurality of past service requests and the refined compendium to generate a ranking of past service requests that ranks the plurality of past service requests based on similarity to the new service request. The ranking of past service requests enables the computer system to identify a set of possible resolutions for the new service request.

As used herein, a "set of" with reference to items may include one or more items. In this manner, a set of possible resolutions may include one or more possible resolutions.

In the illustrative examples described below, the same reference numeral may be used in more than one figure. This reuse of a reference numeral in different figures represents the same element in the different figures.

Figure 1:
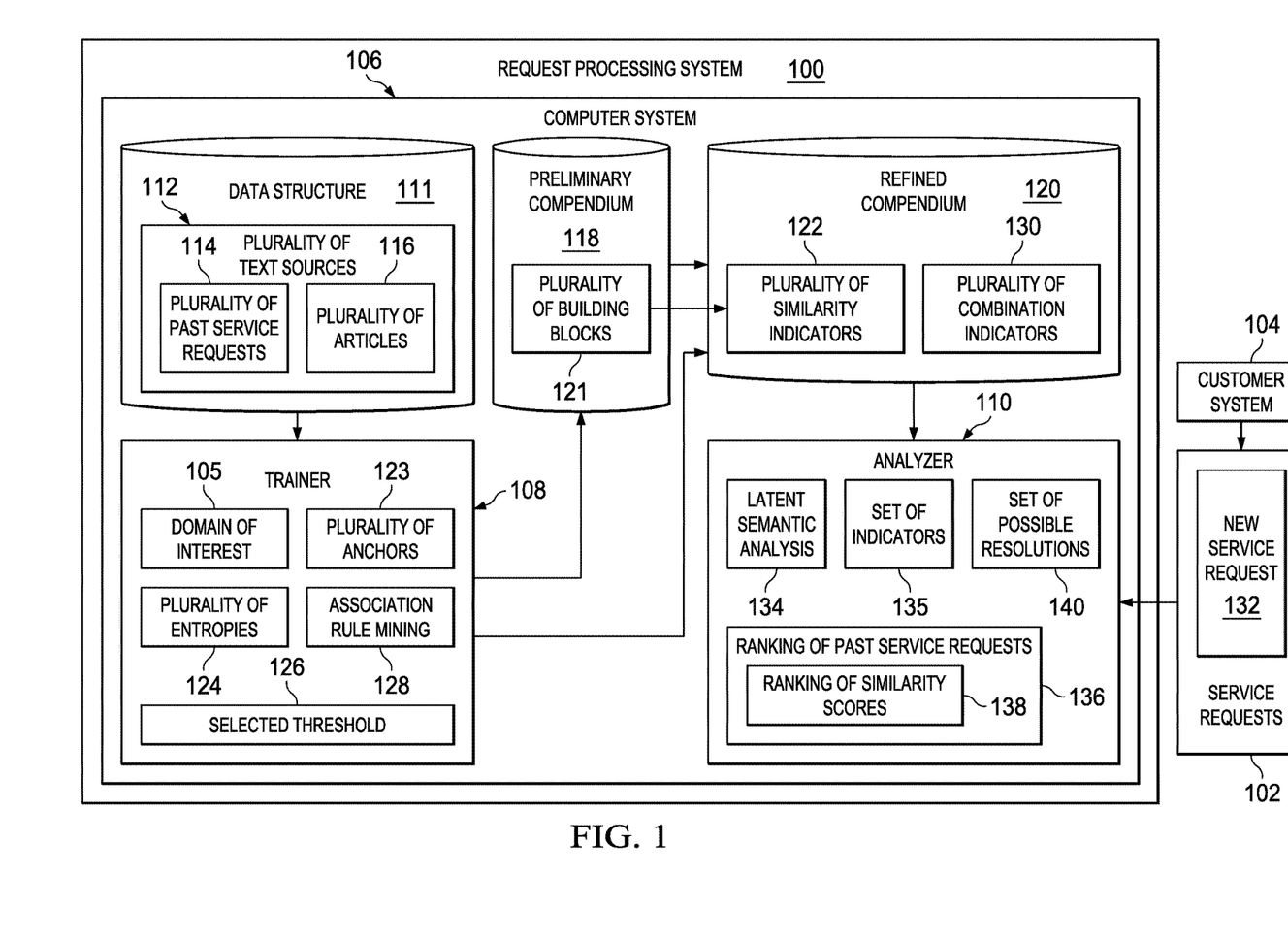
FIG. 1 is a block diagram of a request processing system in accordance with an illustrative embodiment.

Referring now to the figures and, in particular, with reference to FIG. 1, a block diagram of a request processing system is depicted in accordance with an illustrative embodiment. In this illustrative example, request processing system 100 may be used to process service requests 102 received from customer system 104. Request processing system 100 may be managed by a maintenance provider such as, for example, without limitation, a manufacturer.

Service requests 102 may be related to a domain of interest 105. Domain of interest 105 may be, for example, without limitation, the maintenance of a complex system, such as an aircraft, a spacecraft, a satellite, a watercraft, a robotic machine, an engine system, or some other complex system.

As one illustrative example, domain of interest 105 takes the form of aircraft maintenance. In this example, customer system 104 may be managed by an airline customer and request processing system 100 may be managed by an aircraft manufacturer. The airline customer may use customer system 104 to send service requests 102 related to the maintenance of one or more different types of aircraft in a fleet of aircraft owned by the airline customer to request processing system 100.

In this manner, request processing system 100 and customer system 104 are in communication with each other. Depending on the implementation, this communication may be facilitated using at least one communications link. As used herein, a "communications link" may take the form of a wired communications link, a wireless communications link, an optical communications link, or some other type of communications link.

As depicted, request processing system 100 may be implemented using computer system 106. Computer system 106 may comprise a single computer or multiple computers in communication with each other. In other illustrative examples, request processing system 100 may be implemented using a cloud computing system, an associative memory, or both.

Request processing system 100 may include trainer 108 and analyzer 110. Each of trainer 108 and analyzer 110 may be implemented as a module in computer system 106. In one illustrative example, trainer 108 may be referred to as a trainer module and analyzer 110 may be referred to as an analyzer module.

In this illustrative example, a module, such as trainer 108 or analyzer 110, may be implemented in software, hardware, firmware, or a combination thereof. When software is used, the operations performed by the module may be implemented using, for example, without limitation, program code configured to run on a processor unit. When firmware is used, the operations performed by the module may be implemented using, for example, without limitation, program code and data, and stored in persistent memory to run on a processor unit.

When hardware is employed, the hardware may include one or more circuits that operate to perform the operations performed by the module. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, trainer 108 may be in communication with data structure 111 that stores plurality of text sources 112. Depending on the implementation, data structure 111 takes the form of a single database, multiple databases, a set of spreadsheets, or some other type of data structure.

As depicted, plurality of text sources 112 may include plurality of past service requests 114 and plurality of articles 116. Each past service request in plurality of past service requests 114 may be a service request that was previously received and handled by the maintenance provider. Each article in plurality of articles 116 may take the form of a publicly available article, a proprietary article, a specification, a manual, or some other type of source of text related to system maintenance in electronic form. In one illustrative example, each text source in plurality of text sources 112 relates to domain of interest 105.

Trainer 108 may access plurality of text sources 112 and process plurality of text sources 112 to create preliminary compendium 118. As used herein, a "compendium" is a collection or compilation of items. Preliminary compendium 118 may be stored in a database or some other type of data structure.

Preliminary compendium 118 comprises plurality of building blocks 121. Each building block in plurality of building blocks 121 is a word entity that has been extracted from a text source in plurality of text sources 112. A word entity is a single word, a root word, or a string of words, depending on the implementation.

In one illustrative example, trainer 108 processes the unstructured, raw text within plurality of text sources 112 based on plurality of anchors 123. Plurality of anchors 123 may also be referred to as a plurality of selected anchors. Each anchor in plurality of anchors 123 may be a predefined grammatical beacon that signifies that there is a high chance of encountering a word entity of significance with respect to domain of interest 105 near the anchor. Examples of anchors may include, but are not limited to, " . . . found . . . ," " . . . were found on . . . ," " . . . inspecting the . . . ," " . . . affected . . . ," and " . . . found at . . . ," as well as other types of anchors.

Trainer 108 searches through the unstructured, raw text in each text source of plurality of text sources 112 to identify the presence of any anchors from plurality of anchors 123. For each anchor found, trainer 108 identifies a neighborhood of text around the anchor. The neighborhood of text may be, for example, defined as some selected number of words preceding and following the anchor that is most likely to contain a word entity of significance with respect to domain of interest 105.

For example, a neighbor of text may include all of the words within the eight words preceding a corresponding anchor and within the eight words following the anchor. As one specific example, each word of the eight words preceding a particular anchor and each word of the eight words following the particular anchor may form a building block. In another illustrative example, a neighbor of text may include all of the words within the 10 words preceding a corresponding anchor and within the 15 words following the anchor.

In some cases, trainer 108 may be trained to disregard certain types of language elements when identifying the neighborhood of text. For example, trainer 108 may count the 10 words preceding an anchor and the 10 words following the anchor, excluding articles such as "a," "an" and "the" when counting these words. Thus, in some cases, the neighborhood of text may be the 10 non-article words preceding an anchor and the 10 non-article words following the anchor.

Trainer 108 adds each word entity found within a neighborhood of text around each anchor identified in plurality of text sources 112 to plurality of building blocks 121 to form preliminary compendium 118. Trainer 108 then creates refined compendium 120 from plurality of building blocks 121 in preliminary compendium 118.

Refined compendium 120 comprises plurality of similarity indicators 122. Each similarity indicator in plurality of similarity indicators 122 is a building block from plurality of building blocks 121 that has been determined by trainer 108 to have a threshold impact with respect to domain of interest 105. In this manner, a building block in plurality of building blocks 121 is a word entity that has the potential to be a similarity indicator.

Trainer 108 filters plurality of building blocks 121 in preliminary compendium 118 based on relevance with respect to domain of interest 105 to create plurality of similarity indicators 122 that form refined compendium 120. For example, without limitation, trainer 108 may compute plurality of entropies 124. In particular, trainer 108 computes an entropy for each building block in plurality of building blocks 121. The entropy may measure the impact of a word entity with respect to domain of interest 105. In other words, the entropy may measure the significance of a word entity to domain of interest 105. If the entropy for a selected building block is below selected threshold 126, the selected building block is added to refined compendium 120 as a similarity indicator. In one illustrative example, the entropy may be computed as follows:

$$\text{Entropy} = \log(\text{count in everyday English}) \times \frac{\text{count in everyday English}}{\text{count in maintenance records}}.$$

Trainer 108 may then perform association rule mining 128 using plurality of similarity indicators 122 and plurality of text sources 112. For example, without limitation, trainer 108 may map each of plurality of similarity indicators 122 back to each corresponding text source in plurality of text sources 112. Trainer 108 then identifies an order for the one or more similarity indicators in each text source. Trainer 108 performs association rule mining 128 to identify plurality of combination indicators 130. Each combination indicator in plurality of combination indicators 130 may be formed by two or more similarity indicators that appear together in one or more text sources and have relevance to domain of interest 105. Association rule mining 128 may be performed using any number of available association rule learning algorithms.

Both preliminary compendium 118 and refined compendium 120 are dynamic, meaning that these two compendiums may be modified over time to take into account new articles and new service requests that become accessible to request processing system 100. For example, without limitation, over time, any number of new text sources may be added to data structure 111. In some illustrative examples, when a new text source is added to data structure 111, trainer 108 may automatically reprocess plurality of text sources 112 in the manner described above to update preliminary compendium 118 and refined compendium 120. In other illustrative examples, a user may select when trainer 108 initiates reprocessing plurality of text sources 112 to recreate preliminary compendium 118 and refined compendium 120. In still other illustrative examples, trainer 108 may be configured to periodically perform this process once every week, once every month, or upon the occurrence of some other type of event.

Analyzer 110 processes new service requests that are received using refined compendium 120. As one illustrative example, analyzer 110 of request processing system 100 may receive new service request 132 over at least one communications link from customer system 104. In response to receiving new service request 132, analyzer 110 analyzes the text within new service request 132 using plurality of past service requests 114 stored in data structure 111 and refined compendium 120 to generate ranking of past service requests 136 for new service request 132.

Analyzer 110 may use refined compendium 120 to identify the presence of any similarity indicators in new service request 132. For example, analyzer 110 may identify set of indicators 135 in new service request 132. Analyzer 110 may then perform latent semantic analysis 134 to compare new service request 132 to each past service request in plurality of past service requests 114 based on set of indicators 135 identified in new service request 132. In performing this process, analyzer 110 generates a similarity score for each pairing of new service request 132 and a corresponding past service request in plurality of past service requests 114. The similarity score measures the similarity between new service request 132 and the corresponding past service request based on set of indicators 135 identified.

Analyzer 110 creates ranking of past service requests 136 that includes ranking of similarity scores 138. Ranking of past service request 136 may be a ranking of plurality of past service requests 114 by similarity score. Ranking of past service requests 136 enables request processing system 100 to identify set of possible resolutions 140 for new service request 132.

As one illustrative example, analyzer 110 may identify set of possible resolutions 140 as the resolution that was used to resolve the past service request having the highest similarity score for new service request 132. In some illustrative examples, a similarity score may need to be above selected threshold 126 before the resolution for the corresponding past service request will be considered as a possible resolution for new service request 132.

In this manner, analyzer 110 effectively "resolves" new service request 132. Once new service request 132 has been resolved by request, new service request 132 is added to plurality of past service requests 114 and stored in data structure 111.

In this manner, request processing system 100 enables the processing of incoming new service requests such that a search for a resolution to each incoming new service request may be tailored to domain of interest 105. Set of possible resolutions 140 may be output in a form readable by an operator of request processing system 100 for approval and then sent to customer system 104 for use in resolving a maintenance issue.

Thus, request processing system 100 uses anchors to identify building blocks that potentially have relevance to domain of interest 105. Entropy analysis is performed by request processing system 100 to determine which building blocks may be considered similarity indicators. Request processing system 100 performs association rule mining to identify combination indicators. The similarity indicators and combination indicators together form refined compendium 120.

When a new service request is received, request processing system 100 performs a free associative text search on the new service request to come up with a set of indicators based on the refined compendium. This search may be performed without requiring a higher level of engineering expertise by the user of request processing system 100. Further, this search may be performed even though the new service request contains unprocessed, unformatted, non-standardized, raw text.

The set of indicators identified for the new service request may be used to find the past service request having the highest correlation to the new service request. In this manner, a diagnosis for the new service request may be provided by finding the prior diagnosis for a past service request that is most highly correlated.

The illustration of request processing system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In other illustrative examples, trainer 108 and analyzer 110 may be implemented as part of the same module. In some illustrative examples, set of possible resolutions 140 may be displayed to a user in a graphical user interface on a display system in communication with computer system 106. Further, set of possible resolutions 140 may be displayed to a user in a graphical user interface on a display system in communication with customer system 104.

Figure 2:
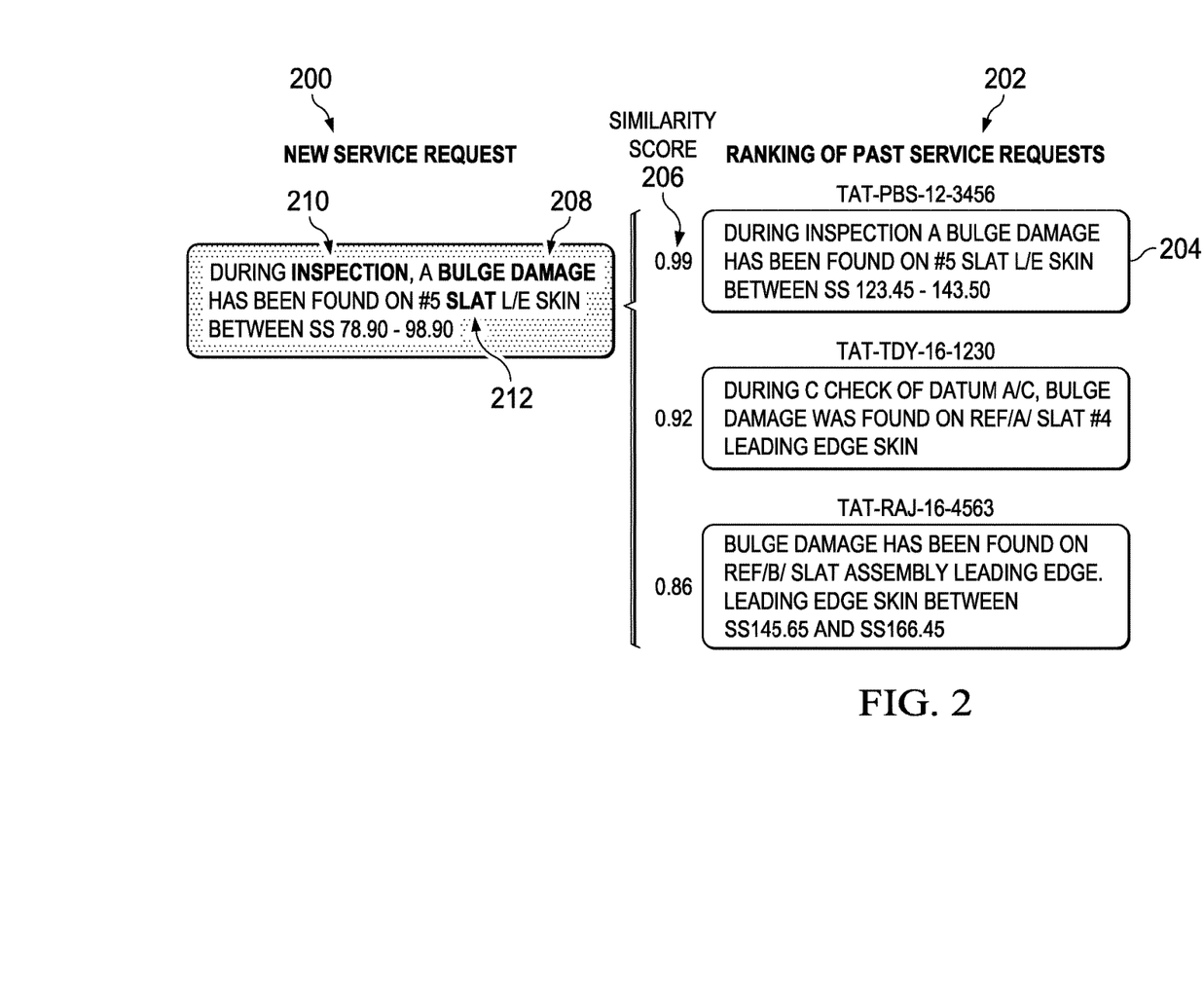
FIG. 2 is an illustration of a new service request and a ranking of past service requests in accordance with an illustrative embodiment.

With reference now to FIG. 2, an illustration of a new service request and a ranking of past service requests is depicted in accordance with an illustrative embodiment. In this illustrative example, new service request 200 may be an example of new service request 132 in FIG. 1.

In response to receiving new service request 200, request processing system 100 in FIG. 1 may generate ranking of similar past service requests 202. Ranking of similar past service requests 202 may be an example of one implementation for ranking of past service requests 136 in FIG. 1.

As depicted, each past service request in ranking of similar past service requests 202 has been assigned a similarity score. Past service request 204 has similarity score 206, which is the highest similarity score, indicating that past service request 204 is the most similar to new service request 200. This similarity was measured based on similarity indicators. For example, similarity indicator 208, similarity indicator 210, and similarity indicator 212 may have been identified in new service request 200 and used to compare new service request 200 to past service requests. Similarity indicator 208 is "bulge damage;" similarity indicator 210 is "inspection;" and similarity indicator 212 is "slat."

Similarity score 206 indicates that past service request 204 is sufficiently similar to new service request 200 such that the resolution previously used to resolve past service request 204 may be used to resolve new service request 200 or may be used at least as a starting point for resolving new service request 200. In some cases, the resolution may be the same resolution that is needed for new service request 200. In other cases, the resolution may need to be modified. The resolution may include a set of resolution elements, which may include, but is not limited to, one or more repairs, inspections, replacements, other types of maintenance operations, or a combination thereof.

Figure 3:
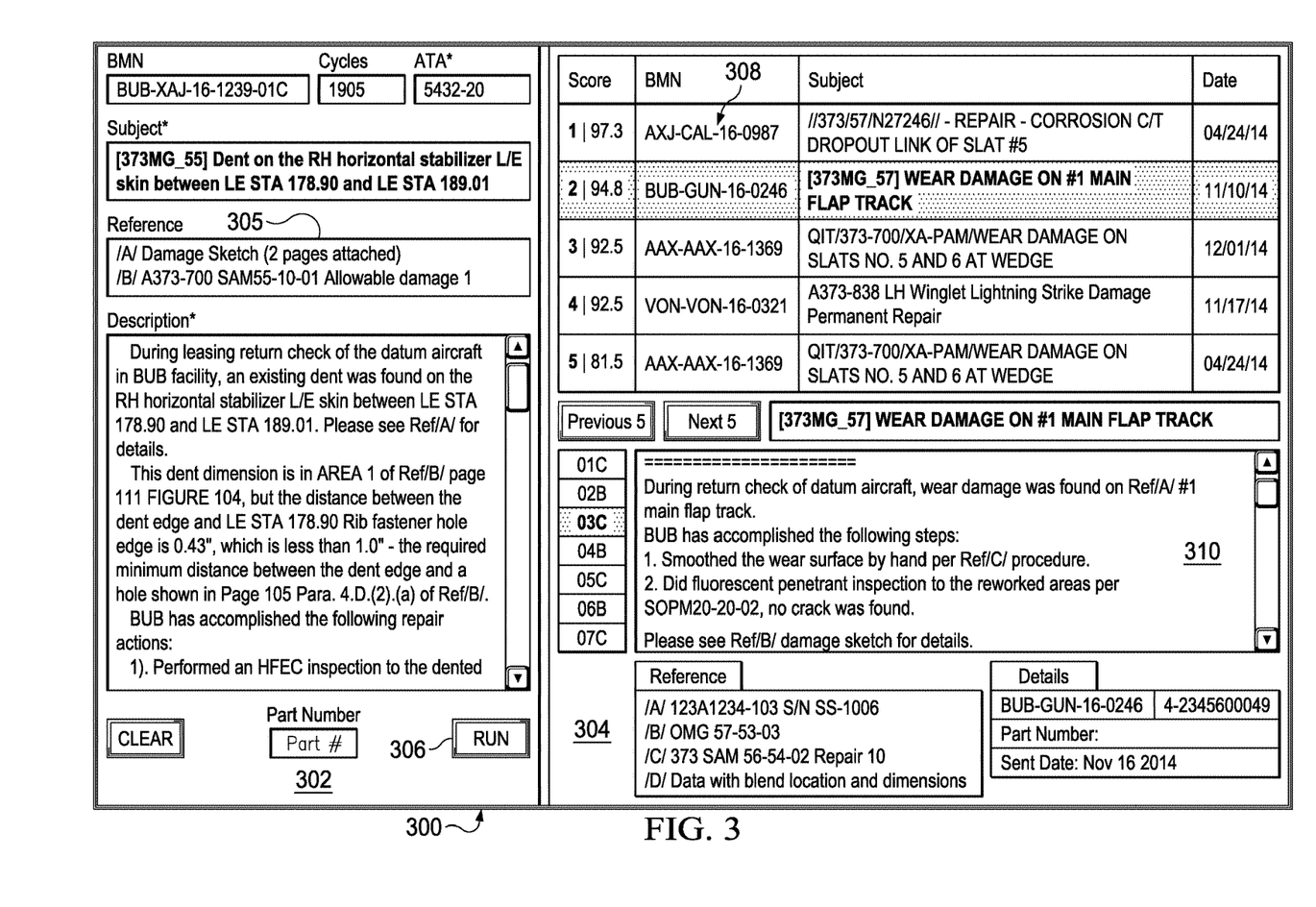
FIG. 3 is an illustration of a graphical user interface in accordance with an illustrative embodiment.

With reference now to FIG. 3, an illustration of a graphical user interface is depicted in accordance with an illustrative embodiment. In this illustrative example, graphical user interface 300 includes new request section 302 and analysis section 304. Graphical user interface 300 may be in communication with request processing system 100 in FIG. 1.

New request section 302 displays information 305 about a new service request that has been received by request processing system 100 in FIG. 1. Selecting run button 306 initiates an analysis of the new service request. This analysis may be performed by analyzer 110 in FIG. 1. Analyzer 110 in FIG. 1 may generate ranking of past service requests 308 that is displayed in analysis section 304. Ranking of past service requests 308 may be an example of one implementation for ranking of past service requests 136 in FIG. 1.

As depicted, ranking of past service requests 308 includes a similarity score for each past service request that is identified. A selection of one of these past service requests by a user causes resolution information 310 corresponding to that past service request to be displayed in analysis section 304. Resolution information 310 may include information about the past service request and information about how this past service request was resolved.

Figure 4:
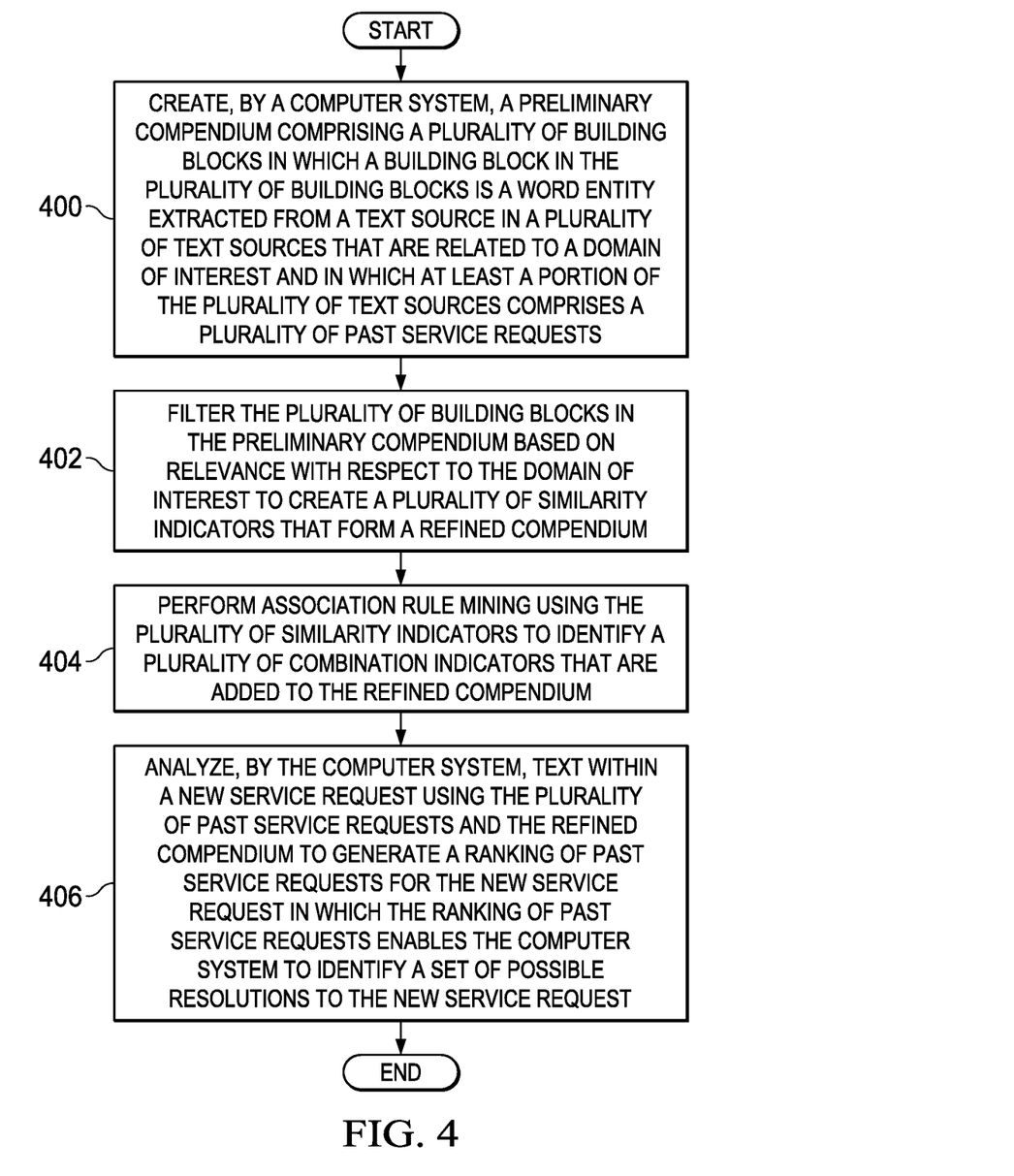
FIG. 4 is a flowchart of a process for processing service requests in accordance with an illustrative embodiment.

With reference now to FIG. 4, a flowchart of a process for processing service requests is depicted in accordance with an illustrative embodiment. The process illustrated in FIG. 4 may be implemented using request processing system 100 in FIG. 1.

The process may begin by creating, by a computer system, a preliminary compendium comprising a plurality of building blocks in which a building block in the plurality of building blocks is a word entity extracted from a text source in a plurality of text sources that are related to a domain of interest and in which at least a portion of the plurality of text sources comprises a plurality of past service requests (operation 400). Next, the plurality of building blocks in the preliminary compendium is filtered based on relevance with respect to the domain of interest to create a plurality of similarity indicators that form a refined compendium (operation 402).

The computer system then performs association rule mining using the plurality of similarity indicators to identify a plurality of combination indicators that are added to the refined compendium (operation 404). Thereafter, the computer system may analyze text within a new service request using the plurality of past service requests and the refined compendium to generate a ranking of past service requests for the new service request in which the ranking of past service requests enables the computer system to identify a set of possible resolutions to the new service request (operation 406), with the process terminating thereafter.

In the process described above, the refined compendium enables the computer system to quickly and accurately identify the past service requests that are most similar to the incoming new service request. Further, the ranking of past service requests enables the computer system to quickly and accurately identify a resolution for the new service request. In one illustrative example, the domain of interest may be aircraft maintenance.

Figure 5:
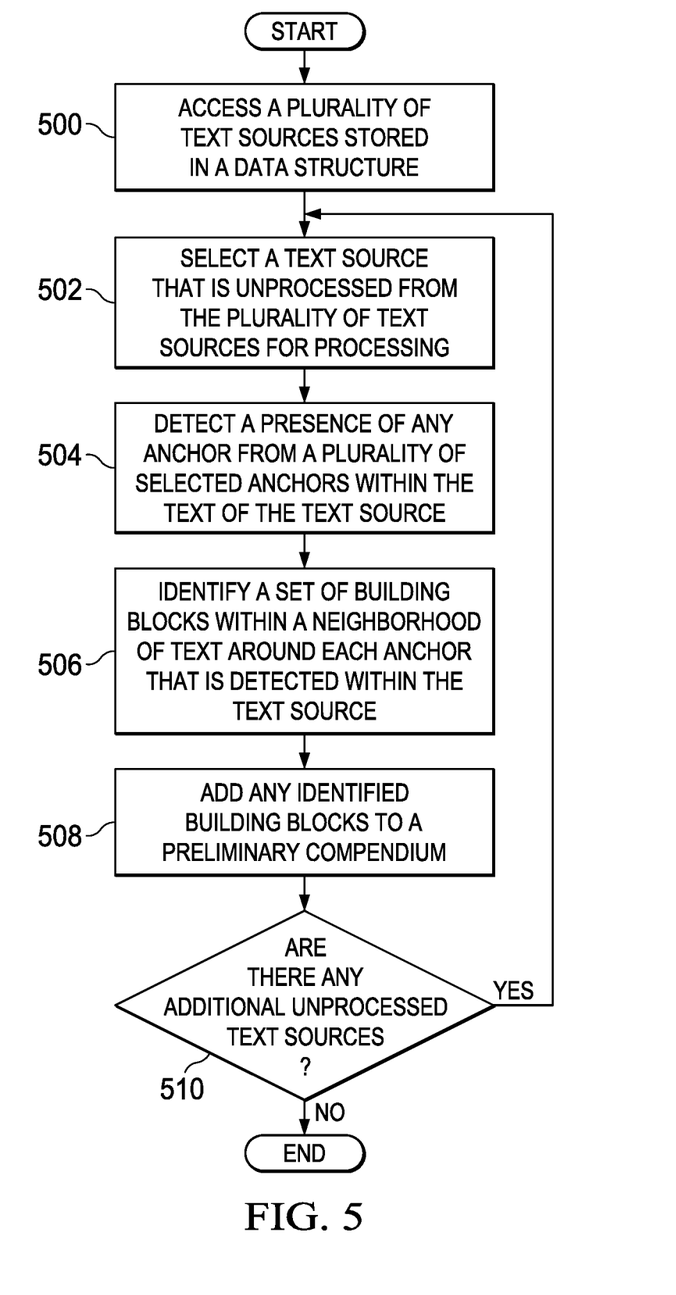
FIG. 5 is a flowchart of a process for creating a preliminary compendium in accordance with an illustrative embodiment.

With reference now to FIG. 5, a flowchart of a process for creating a preliminary compendium is depicted in accordance with an illustrative embodiment. The process illustrated in FIG. 5 may be implemented using request processing system 100 in FIG. 1. This process may be used to implement, for example, without limitation, operation 400 in FIG. 4.

The process may begin by accessing a plurality of text sources stored in a data structure (operation 500). Next, a text source that is unprocessed is selected from the plurality of text sources for processing (operation 502). In operation 502, the selected text source may be either a past service request or an article.

A presence of any anchor from a plurality of selected anchors is detected within the text of the text source (operation 504). In operation 504, an anchor may be a predefined grammatical beacon that signifies that there is a high chance of encountering a word entity of significance near the anchor. Examples of anchors may include, but are not limited to, " . . . found . . . ," " . . . were found on . . . ," " . . . inspecting the . . . ," " . . . affected . . . ," and " . . . found at . . . ," as well as other types of anchors.

A set of building blocks is identified within a neighborhood of text around each anchor that is detected within the text source (operation 506). In operation 506, a building block is a word entity. The neighborhood of text around an anchor may be, for example, without limitation, a predefined number of words around the anchor. As one illustrative example, the neighborhood of text around an anchor may be selected as the ten words preceding an anchor and the ten words following an anchor. In another illustrative example, the neighborhood of text around an anchor may be selected as the eight words preceding an anchor and the eight words following an anchor.

Any identified building blocks are added to a preliminary compendium (operation 508). A determination is then made as to whether there are any additional unprocessed text sources (operation 510). If there are not any additional unprocessed text sources, the process terminates. Otherwise, the process proceeds to operation 502 as described above.

Figure 6:
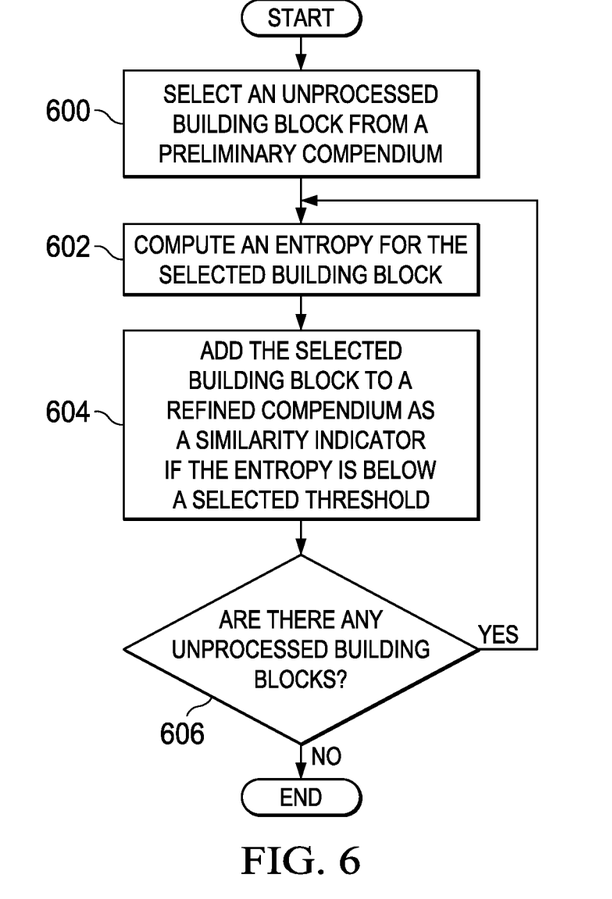
FIG. 6 is a flowchart of a process for creating a refined compendium in accordance with an illustrative embodiment.

With reference now to FIG. 6, a flowchart of a process for creating a refined compendium is depicted in accordance with an illustrative embodiment. The process illustrated in FIG. 6 may be implemented using request processing system 100 in FIG. 1. This process may be used to implement, for example, without limitation, operation 402 in FIG. 4.

The process may begin by selecting an unprocessed building block from a preliminary compendium (operation 600). An entropy is computed for the selected building block (operation 602). The selected building block is added to a refined compendium as a similarity indicator if the entropy is below a selected threshold (operation 604). In operation 604, the selected building block is not added to the refined compendium if the entropy is equal to or above the selected threshold. However, in other illustrative examples, in operation 604, the selected building block may be added to the refined compendium if the entropy is equal to or below the selected threshold.

A determination is then made as to whether there are any unprocessed building blocks in the preliminary compendium (operation 606). If there are any unprocessed building blocks in the preliminary compendium, the process proceeds to operation 600 as described above. Otherwise, the process terminates.

Figure 7:
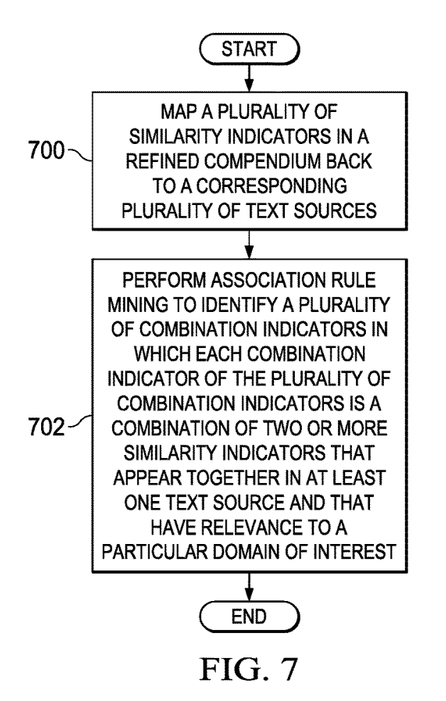
FIG. 7 is a flowchart of a process for creating a plurality of request models in accordance with an illustrative embodiment.

With reference now to FIG. 7, a flowchart of a process for generating a plurality of combination indicators is depicted in accordance with an illustrative embodiment. The process illustrated in FIG. 7 may be implemented using request processing system 100 in FIG. 1. This process may be used to implement, for example, without limitation, operation 404 in FIG. 4. In one illustrative example, this process may be performed after the process described in FIG. 6.

The process may begin by mapping a plurality of similarity indicators in a refined compendium back to a corresponding plurality of text sources (operation 700). In operation 700, each similarity indicator is mapped to the original text source form which that similarity indicator was extracted. Thereafter, association rule mining is performed to identify a plurality of combination indicators in which each combination indicator of the plurality of combination indicators is a combination of two or more similarity indicators that appear together in at least one text source and that have relevance to a particular domain of interest (operation 702), with the process terminating thereafter.

Figure 8:
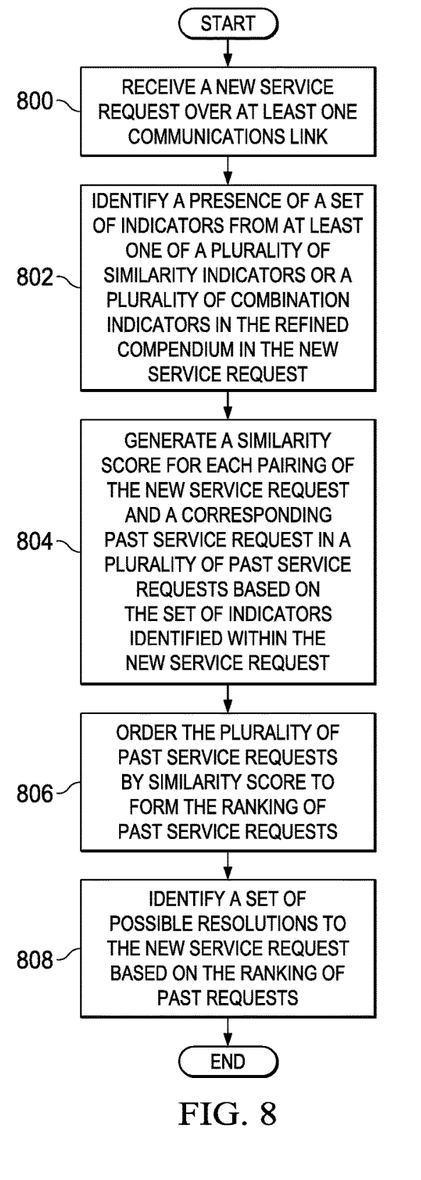
FIG. 8 is a flowchart of a process for analyzing a new service request in accordance with an illustrative embodiment.

With reference now to FIG. 8, a flowchart of a process for analyzing a new service request is depicted in accordance with an illustrative embodiment. The process illustrated in FIG. 8 may be implemented using request processing system 100 in FIG. 1.

The process begins by receiving a new service request over at least one communications link (operation 800). Next, a presence of a set of indicators from at least one of a plurality of similarity indicators or a plurality of combination indicators in the refined compendium is identified in the new service request (operation 802). Thus, in operation 804, an indicator in the set of indicators may be either a similarity indicator or a combination indicator stored in the refined compendium. In operation 802, the set of indicators may include one or more similarity indicators from the plurality of similarity indicators in the refined compendium, one or more combination indicators from the plurality of combination indicators, or both.

Thereafter, a similarity score is generated for each pairing of the new service request and a corresponding past service request in a plurality of past service requests based on the set of indicators identified within the new service request (operation 804). Then, the plurality of past service requests is ordered by similarity score to form the ranking of past service requests (operation 806). A set of possible resolutions to the new service request is identified based on the ranking of past service requests (operation 806), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
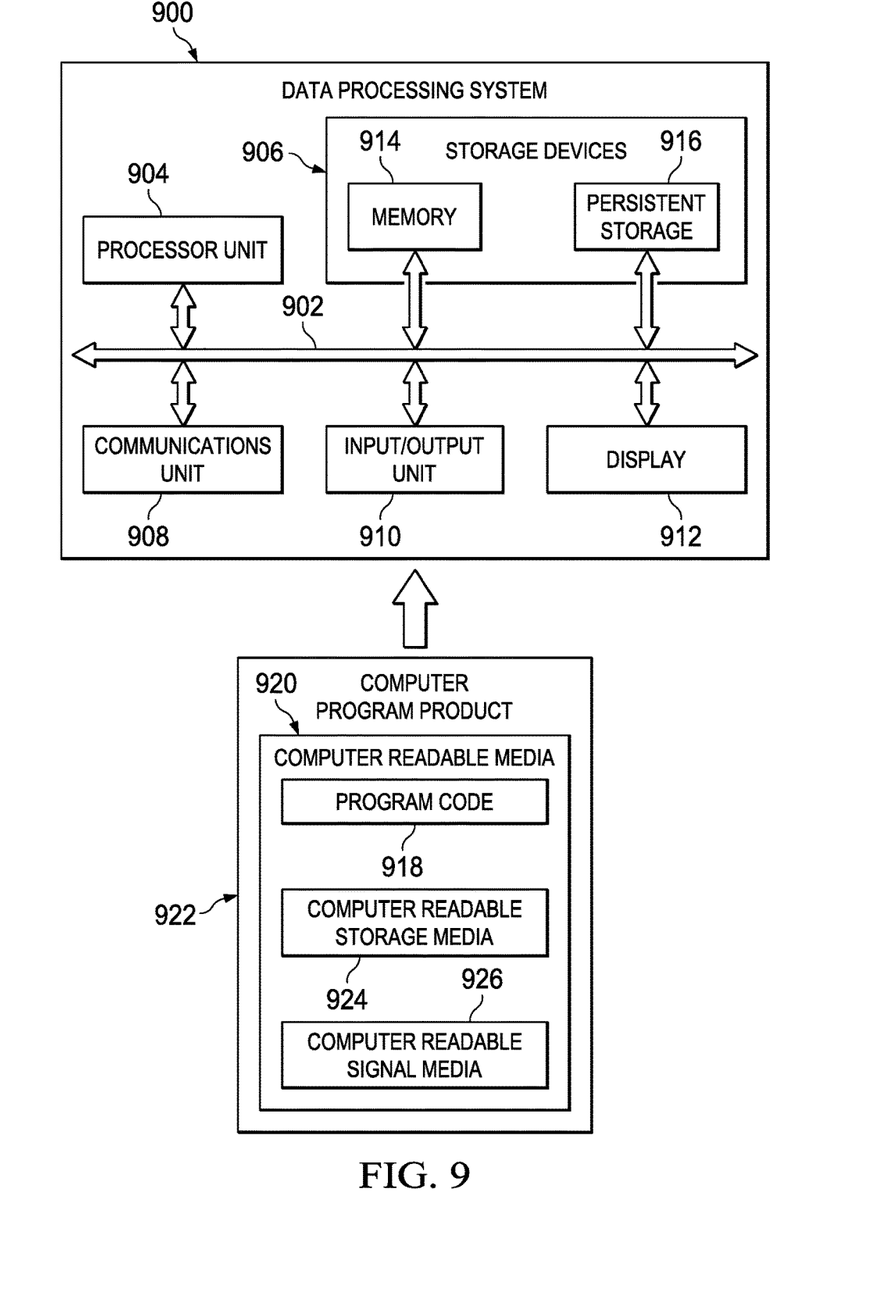
FIG. 9 is a block diagram of a data processing system in accordance with an illustrative embodiment.

Turning now to FIG. 9, an illustration of a data processing system in the form of a block diagram is depicted in accordance with an illustrative embodiment. Data processing system 900 may be used to implement computer system 106 in FIG. 1. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multi-processor core, and/or some other type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative embodiments may be performed by processor unit 904 using computer-implemented instructions. These instructions may be referred to as program code, computer usable program code, or computer readable program code and may be read and executed by one or more processors in processor unit 904.

In these examples, program code 918 is located in a functional form on computer readable media 920, which is selectively removable, and may be loaded onto or transferred to data processing system 900 for execution by processor unit 904. Program code 918 and computer readable media 920 together form computer program product 922. In this illustrative example, computer readable media 920 may be computer readable storage media 924 or computer readable signal media 926.

Computer readable storage media 924 is a physical or tangible storage device used to store program code 918 rather than a medium that propagates or transmits program code 918. Computer readable storage media 924 may be, for example, without limitation, an optical or magnetic disk or a persistent storage device that is connected to data processing system 900.

Alternatively, program code 918 may be transferred to data processing system 900 using computer readable signal media 926. Computer readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the illustrative embodiments may be implemented. The different illustrative embodiments may be implemented in a data processing system that includes components in addition to or in place of those illustrated for data processing system 900. Further, components shown in FIG. 9 may be varied from the illustrative examples shown.

Thus, the illustrative embodiments provide a system and method that effectively achieves maintenance information extraction through a novel sequential set of methods. Using association rule mining as a way to build similarity indicators may be a unique and non-obvious methodology. The method and system described by the different illustrative embodiments does not require a pre-labeled set of relevant word entities or dictionary in order to initially train a model.

Rather, the illustrative embodiments create a refined compendium of indicators based on historical data, which may include past service requests and articles. The methodology itself narrows down the number of possible candidates through a sequential set of rules and identifies word entities and word entity combinations without the operator needing prior knowledge of what these words are.

In one illustrative example, a method, apparatus, and request processing system for processing service requests are provided. A computer system processes unstructured, raw text in a plurality of text sources related to a domain of interest in which the plurality of text sources includes at least a plurality of past service requests to identify the presence of any anchors from a plurality of selected anchors in the plurality of text sources. The computer system identifies a plurality of building blocks from the plurality of text sources in which each of the plurality of building blocks is extracted from a neighborhood of text around each anchor identified in the plurality of text sources. A building block in the plurality of building blocks is a word entity extracted from a text source in the plurality of text sources that are related to the domain of interest. The computer system creates a preliminary compendium comprising the plurality of building blocks.

The computer system computes an entropy for each of the plurality of building blocks in the preliminary compendium. The computer system then filters the plurality of building blocks in the preliminary compendium based on the entropy computed for each of the plurality of building blocks to create a plurality of similarity indicators that form a refined compendium. In some cases, the computer system performs association rule mining to identify a plurality of combination indicators based on the plurality of similarity indicators. The plurality of combination indicators is added to the refined compendium.

The computer system analyzes text within a new service request received over at least one communications link using the plurality of past service requests and the refined compendium to generate a ranking of past service requests that ranks the plurality of past service requests based on similarity to the new service request. The ranking of past service requests enables the computer system to identify a set of possible resolutions for the new service request.

The descriptions of the different illustrative embodiments have been presented for purposes of illustration and description, and are not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for improving a processing speed of processing service requests, the method comprising:
   creating, by a computer system, a preliminary compendium comprising a plurality of building blocks, wherein a building block in the plurality of building blocks is a word entity extracted from a text source in a plurality of text sources that are related to a domain of interest and wherein at least a portion of the plurality of text sources comprises a plurality of past service requests;

filtering, by the computer system, the plurality of building blocks in the preliminary compendium based on relevance with respect to the domain of interest to create a plurality of similarity indicators that form a refined compendium;

analyzing, by the computer system, text within a new service request using the plurality of past service requests and the refined compendium to generate a ranking of past service requests that ranks the plurality of past service requests based on similarity to the new service request, wherein the ranking of past service requests enables the computer system to accurately identify a resolution for the new service request; and displaying, by the computer system, a graphical user interface comprising a request section that displays the text of the new service request and an analysis section that displays the ranking of past service requests, wherein in response to a user selection of a past service request the analysis section displays resolution information corresponding to that past service request.

2. The method of claim 1, wherein creating, by the computer system, the preliminary compendium comprises:
selecting a text source that is unprocessed from the plurality of text sources for processing, wherein the text source is either a past service request in the plurality of past service requests or an article; and
determining whether at least one anchor from a plurality of selected anchors is present in the text source.

3. The method of claim 2, wherein creating, by the computer system, the preliminary compendium further comprises:
identifying a neighborhood of text around each anchor identified in the text source in response to a determination that at least one anchor is present in the text source; and
adding each word entity found in the neighborhood of text as a building block to the preliminary compendium.

4. The method of claim 3, wherein creating, by the computer system, the preliminary compendium further comprises:
repeating the selecting step, the determining step, the identifying step, and the adding step for each text source in the plurality of text sources to create the preliminary compendium.

5. The method of claim 1 further comprising:
adding the new service request to the plurality of past service requests after the new service request has been resolved.

6. The method of claim 1, wherein filtering, by the computer system, the plurality of building blocks comprises:
computing an entropy for each building block in the plurality of building blocks in the preliminary compendium to form a plurality of entropies.

7. The method of claim 6, wherein filtering, by the computer system, the plurality of building blocks further comprises:
adding a selected building block to the refined compendium as a similarity indicator if the entropy computed for the selected building block is below a selected threshold.

8. The method of claim 1 further comprising:
performing, by the computer system, association rule mining using the plurality of similarity indicators in the refined compendium to form a plurality of combination indicators.

9. The method of claim 8, wherein performing, by the computer system, the association rule mining comprises:
mapping the plurality of similarity indicators to the plurality of text sources; and
identifying the plurality of combination indicators based on mapping the plurality of similarity indicators to the plurality of text sources and a set of association rule learning algorithms, wherein a combination indicator in the plurality of combination indicators is formed by a combination of at least two similarity indicators from the plurality of similarity indicators.

10. The method of claim 1 further comprising:
identifying, by the computer system, a set of possible resolutions to the new service request based on a highest ranked past service request in the ranking of past service requests.

11. The method of claim 1, wherein analyzing, by the computer system, the text within the new service request comprises:
identifying a set of indicators that are present in the new service request using the refined compendium, wherein an indicator in the set of indicators is one of a similarity indicator and a combination indicator; and
generating a similarity score for each pairing of the new service request and a corresponding past service request in the plurality of past service requests based on the set of indicators identified within the new service request.

12. The method of claim 11, wherein analyzing, by the computer system, the text within the new service request further comprises:
ordering the plurality of past service requests by the similarity score to form the ranking of past service requests.

13. An apparatus comprising:
a computer system comprising a bus system, a storage device connected to the bus system, wherein the storage device stores program instructions, and a number of processors connected to the bus system, wherein the number of processors execute the program instructions;
a trainer implemented in the computer system that creates a preliminary compendium comprising a plurality of building blocks, wherein a building block in the plurality of building blocks is a word entity extracted from a text source in a plurality of text sources that is related to a domain of interest and wherein at least a portion of the plurality of text sources comprises a plurality of past service requests and wherein the trainer filters the plurality of building blocks in the preliminary compendium based on relevance with respect to the domain of interest to create a plurality of similarity indicators that form a refined compendium;
an analyzer implemented in the computer system that analyzes text within a new service request using the plurality of past service requests and the refined compendium to generate a ranking of past service requests that is ranked based on similarity to the new service request, wherein the ranking of past service requests enables the computer system to accurately identify a resolution for the new service request; and
a display system configured to display a graphical user interface comprising a request section that displays the text of the new service request and an analysis section that displays the ranking of past service requests, wherein the analysis section is configured to display, in response to a user selection of a past service request, resolution information corresponding to that past service request.

14. The apparatus of claim 13 further comprising:
a data structure that stores the plurality of text sources.

15. The apparatus of claim 13, wherein the new service request is received from a customer system in communication with the analyzer.

16. The apparatus of claim 13, wherein the domain of interest is aircraft maintenance.

17. The apparatus of claim 13, wherein the new service request is received from an airline customer.

18. The apparatus of claim 13, wherein the new service request is received by an aircraft manufacturer.

19. The apparatus of claim 13 further comprising:
the preliminary compendium storing the plurality of building blocks; and
the refined compendium storing the plurality of similarity indicators.

20. The apparatus of claim 13, wherein the ranking of past service requests includes a similarity score for each past service request in the plurality of past service requests in which the similarity score for a particular past service request in the plurality of past service requests measures a similarity between the new service request and the particular past service request based on a set of indicators identified in the new service request.

21. The apparatus of claim 13, wherein the trainer and the analyzer form a request processing system.

22. A request processing system implemented in a computer system, wherein the request processing system comprises:
a bus system;
a storage device connected to the bus system, wherein the storage device stores program instructions;
a number of processors connected to the bus system, wherein the number of processors execute the program instructions;
a data structure in the storage device storing a plurality of text sources related to aircraft maintenance, wherein the plurality of text sources includes a plurality of past service requests received from an airline customer;
a trainer that creates a preliminary compendium comprising a plurality of building blocks and filters the plurality of building blocks in the preliminary compendium based on relevance with respect to the aircraft maintenance to create a plurality of similarity indicators that form a refined compendium,
wherein a building block in the plurality of building blocks is a word entity extracted from a text source in the plurality of text sources;
an analyzer that analyzes text within a new service request received over at least one communications link from the airline customer using the plurality of past service requests and the refined compendium to generate a ranking of past service requests that is ranked based on similarity to the new service request,
wherein the ranking of past service requests enables the computer system to accurately identify a resolution for the new service request; and
a graphical user interface comprising a request section configured to display the text of the new service request and an analysis section configured to display the ranking of past service requests, wherein the analysis section is further configured to display, in response to a user selection of a past service request, resolution information corresponding to the past service request.

* * * * *